A. MAYNARD.
CAR-PROPELLER.
No. 176,798. Patented May 2, 1876.
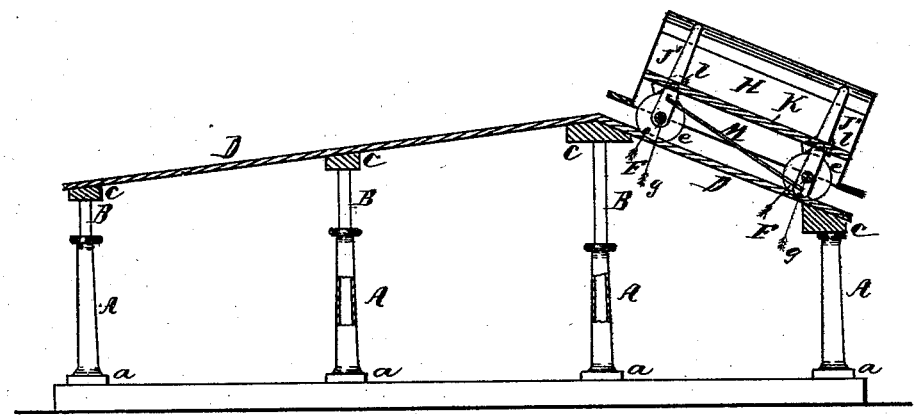
Fig. 1.
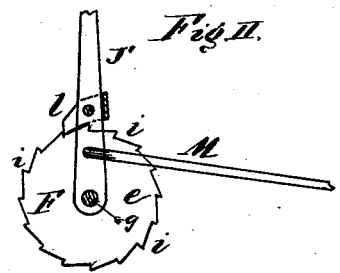
Fig. II.
Witnesses:
Franklin Barritt.
Richard Gerner.
Inventor:
Alfred Maynard.
Per. Henry Gerner,
Atty.

UNITED STATES PATENT OFFICE.

ALFRED MAYNARD, OF WILLIAMSBURG, NEW YORK.

IMPROVEMENT IN CAR-PROPELLERS.

Specification forming part of Letters Patent No. 176,798, dated May 2, 1876; application filed October 8, 1875.

*To all whom it may concern:*

Be it known that I, ALFRED MAYNARD, of Williamsburg, Kings county, State of New York, have invented certain Improvements in Locomotion of Railway-Cars, of which the following is a specification:

The object of my invention is to provide for a cheap and handy locomotion of light railway-cars by employing manual labor for this purpose.

Referring to the accompanying drawing, forming a part of this specification, Figure I represents a side view of a car embodying my invention. Fig. II is a detached side view of one of the car-wheels, with lever, pawl, and connecting-rod attached thereto.

To the outer flange $e$ of the wheels F, fastened to axles $g$, running in journals attached to the car H, are cut teeth $i$. To the outer ends of the axles $g$ are pivoted the vertical levers J, which are operated back and forth by manual power in such a manner that the operators are standing on foot-boards K on each side of the cars. To these levers are pivoted the pawls $l$, the lower ends of which mesh into the teeth $i$ on the wheels F. M are connecting-rods, one end of which is pivoted to the front lever J' above the fulcrum, and the other end to the rear lever J'' below its fulcrum.

By this arrangement, applied to both sides of the cars, and by operating any two of the front or rear levers, the car is propelled.

Having thus described my invention, I desire to claim—

In combination with the wheels F, provided with teeth $i$, the pawl $l$, the levers J, and connecting-rods M, substantially as described, and for the purpose set forth.

This specification signed this 4th day of October, 1875.

A. MAYNARD.

Witnesses:
RICH. GERNER,
FRANKLIN BARRITT.